US012063287B1

(12) United States Patent
Regev et al.

(10) Patent No.: US 12,063,287 B1
(45) Date of Patent: Aug. 13, 2024

(54) METHODS, SYSTEMS, AND COMPUTER READABLE MEDIA FOR DETERMINING AN INTERNAL TIME OF A TIME-SENSITIVE NETWORKING (TSN) NETWORK CARD

(71) Applicant: Keysight Technologies, Inc., Santa Rosa, CA (US)

(72) Inventors: Alon Regev, Woodland Hills, CA (US); Robert-Ionut Alexa, Bucharest (RO); Gabriel-Cosmin Chenaru, Bucharest (RO)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 18/141,284

(22) Filed: Apr. 28, 2023

(30) Foreign Application Priority Data

Apr. 27, 2023 (RO) .............................. a 2023 00212

(51) Int. Cl.
*H04L 69/28* (2022.01)
*H04L 47/28* (2022.01)
*H04L 69/163* (2022.01)

(52) U.S. Cl.
CPC .............. *H04L 69/28* (2013.01); *H04L 47/28* (2013.01); *H04L 69/163* (2013.01)

(58) Field of Classification Search
CPC ........ H04L 69/28; H04L 69/163; H04L 47/28
USPC .......................................................... 709/230
See application file for complete search history.

(56) References Cited

U.S. PATENT DOCUMENTS

| | | | |
|---|---|---|---|
| 9,288,777 | B2 | 3/2016 | Hollabaugh et al. |
| 10,425,321 | B2 | 9/2019 | Joseph et al. |
| 2014/0304505 | A1 | 10/2014 | Dawson |
| 2015/0103828 | A1 | 4/2015 | Chandhoke et al. |
| 2015/0103832 | A1 | 4/2015 | Chandhoke et al. |
| 2015/0103836 | A1 | 4/2015 | Chandhoke et al. |
| 2015/0103848 | A1 | 4/2015 | Chandhoke et al. |
| 2015/0245306 | A1 | 8/2015 | Boehlke |
| 2017/0331748 | A1 | 11/2017 | Mangin |
| 2018/0070373 | A1 | 3/2018 | Muench |
| 2018/0160424 | A1 | 6/2018 | Cavalcanti et al. |

(Continued)

FOREIGN PATENT DOCUMENTS

| | | | |
|---|---|---|---|
| CN | 101631080 | A | 1/2010 |
| CN | 101854268 | A | 10/2010 |
| CN | 108737003 | B | 10/2021 |

OTHER PUBLICATIONS

ETF—Earliest TxTime First (ETF), https://man7.org/linux/man-pages/man8/tc-etf.8.html, Jul. 5, 2018.

(Continued)

*Primary Examiner* — Ruolei Zong

(57) ABSTRACT

A method for determining an internal time of a time-sensitive networking (TSN) network card includes generating at least one initial packet with a launch time parameter at a computing device. The computing device sends the at least one initial packet to a TSN network card for transmission and receives a transmit completion signal from the TSN network card confirming that the TSN network card transmitted the at least one initial packet. The computing device determines an approximate current internal time of the TSN network card using the launch time parameter and the received transmit completion signal.

20 Claims, 4 Drawing Sheets

(56) References Cited

U.S. PATENT DOCUMENTS

| | | | |
|---|---|---|---|
| 2018/0184438 | A1 | 6/2018 | Cavalcanti et al. |
| 2018/0191642 | A1 | 7/2018 | Biederman et al. |
| 2018/0212885 | A1 | 7/2018 | Contavalli et al. |
| 2018/0227067 | A1 | 8/2018 | Hu et al. |
| 2018/0237039 | A1 | 8/2018 | Mong et al. |
| 2018/0302330 | A1 | 10/2018 | Bush |
| 2018/0302331 | A1 | 10/2018 | Bush |
| 2018/0309655 | A1* | 10/2018 | Joseph ................ G06F 11/2294 |
| 2019/0045475 | A1* | 2/2019 | Kasichainula ..... G05B 19/0423 |
| 2019/0087245 | A1* | 3/2019 | Yamaura ............... G06F 13/122 |
| 2020/0287803 | A1* | 9/2020 | Sedarat ................. H04L 43/106 |
| 2021/0014177 | A1* | 1/2021 | Kasichainula ...... H04L 47/6295 |
| 2021/0117353 | A1* | 4/2021 | Kasichainula .......... G06F 13/28 |
| 2021/0303021 | A1 | 9/2021 | Cui |

OTHER PUBLICATIONS

Chinese Office Action for CN 201810373217-5 dated Feb. 2, 2021.

Corrected Notice of Allowability for U.S. Appl. No. 15/498,452 dated Jul. 16, 2019.

Notice of Allowance and Fees Due for U.S. Appl. No. 15/498,452 dated May 10, 2019.

Non-Final Office Action for U.S. Appl. No. 15/498,452 dated Nov. 5, 2018.

* cited by examiner

METHODS, SYSTEMS, AND COMPUTER READABLE MEDIA FOR DETERMINING AN INTERNAL TIME OF A TIME-SENSITIVE NETWORKING (TSN) NETWORK CARD

PRIORITY CLAIM

This application claims the priority benefit of Romanian Patent Application No. (not yet assigned), entitled METHODS, SYSTEMS, AND COMPUTER READABLE MEDIA FOR DETERMINING AN INTERNAL TIME OF A TIME-SENSITIVE NETWORKING (TSN) NETWORK CARD, filed on Apr. 27, 2023, the disclosure of which is incorporated herein by reference in its entirety.

TECHNICAL FIELD

The subject matter described herein relates to determining current times for network cards. More specifically, the subject matter relates to methods, systems, and computer readable media for determining an internal time of a time-sensitive networking (TSN) network card.

BACKGROUND

A network card receives packets from a computer to transmit to a connected network. A time-sensitive networking (TSN) network card can transmit the received packets at a set transmit launch time received from the computer. However, in a high performance networking setup when the TSN network card sends a high volume of packets, system timers are often overloaded and become inaccurate. If overloaded, expiry notifications received might have a delay that is unacceptable for some applications. Further, requesting the current time of the TSN network card's internal clock is disruptive and inconvenient for a computer in a high performance network. There is a need for determining an internal time of a TSN network card that does not require requesting the time from the TSN network card.

SUMMARY

Methods, systems, and computer readable media for determining an internal time of a time-sensitive networking (TSN) network card are disclosed. An example method for determining an internal time of a TSN network card includes generating, at a computing device, at least one initial packet with a launch time parameter. The method further includes sending, by the computing device, the at least one initial packet to a TSN network card for transmission. The method further includes receiving, by the computing device, a transmit completion signal from the TSN network card confirming that the TSN network card transmitted the at least one initial packet. The method further includes determining, by the computing device, an approximate current internal time of the TSN network card using the launch time parameter and the received transmit completion signal.

An example system for determining an internal time of a TSN network card includes a processor, a memory communicatively connected to the processor, and a computing device implemented using the processor and the memory. The computing device is configured for generating at least one initial packet with a launch time parameter. The computing device is further configured for sending the at least one initial packet to a TSN network card for transmission. The computing device is further configured for receiving a transmit completion signal from the TSN network card confirming that the TSN network card transmitted the at least one initial packet. The computing device is further configured for determining an approximate current internal time of the TSN network card using the launch time parameter and the received transmit completion signal.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

The term "network card" as used herein may be interchangeable with network interface card, network interface controller, and NIC.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for determining an internal time of a time-sensitive networking (TSN) network card. A computing device may queue packets for a TSN network card to transmit at a specified time according to a launch time parameter. The computing device may base the launch time parameter on an internal clock in the computing device, which may not be synchronized with the internal time of the TSN network card. To ensure that the computing device is determining launch time parameters according to a time that corresponds with the internal time of the TSN network card, the computing device determines the internal time of the TSN network card as described herein.

The computing device generates one or more packets with a launch time parameter and queues the packets for the TSN network card to transmit. Each of the packets includes metadata with the launch time parameter and information identifying the packet, which the computing device stores. The computing device sends the one or more packets to the TSN network card and receives a transmit completion signal from the TSN network card once the packets have been transmitted. The computing device then determines an approximate current internal time of the TSN network card using the launch time parameter and the received transmit completion signal. The computing device identifies in memory the stored packet that was transmitted and the corresponding launch time parameter. The computing device then determines the current approximate internal time of the TSN network card based on the launch time parameter of the packet that the TSN network card transmitted.

In some embodiments, the computing device may disable the transmit completion signal and polling the TSN network card to determine when the packet is transmitted and determine the internal time of the TSN network card once the packet is transmitted based on the packet's launch time parameter. The computing device may synchronize clocks with the TSN network card, such as a system clock, a CPU clock, etc. Launch time parameters of subsequent packets for transmission may be based on the determined internal time of the TSN network card.

Figure 1:
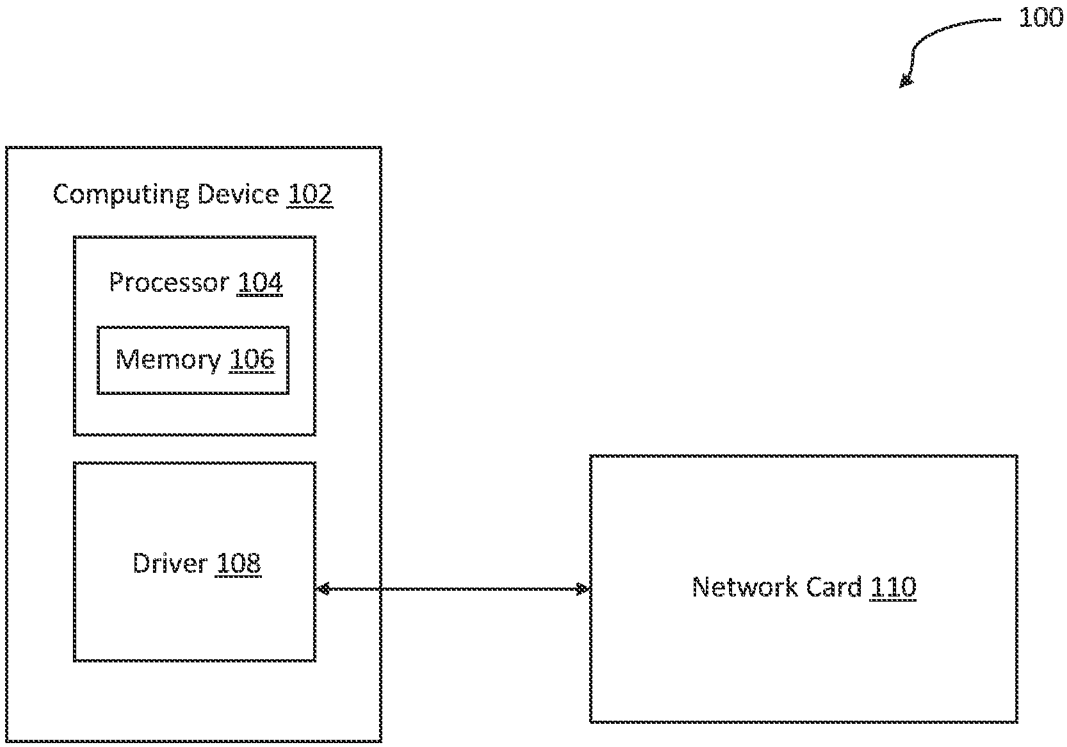
FIG. 1 is a block diagram illustrating an example system for networking that implements a network card configured for sending a transmit completion signal according to an embodiment of the presently disclosed subject matter.

FIG. 1 is a block diagram illustrating a system 100 for networking that implements a network card configured for sending a transmit completion signal. System 100 includes a computing device 102. Computing device 102 may include a server or a workstation. Computing device 102 may include at least one processor 104 and memory 106. Computing device 102 may include, without limitation, a microcontroller, microprocessor, digital signal processor (DSP) and/or system on a chip (SoC) as described herein. Computing device 102 may communicate with a mobile device such as a mobile telephone or smartphone. Computing device 102 may include a single computing device operating independently, or may include two or more computing devices operating in concert, in parallel, sequentially or the like; two or more computing devices may be included together in a single computing device or in two or more computing devices. Computing device 102 may include one or more central processing units (CPUs). Computing device 102, using processor 104 and memory 106, may be configured to perform any of the steps described herein.

Computing device 102 may include a driver 108 configured to communicate with a network card 110. Computing device 102 generates one or more packets and sends the packets to network card 110 via driver 108. Network card 110 receives the packets and transmits them to a connected network. In system 100, network card 110 can send a transmit completion signal to computing device 102, specifically driver 108, when the network card 110 has transmitted the packets. The transmit completion signal may include an interrupt to processor 104, which computing device 102 may acknowledge and signal to network card 110 to stop the interrupt.

Driver 108 may disable transmit completion signals and implement polling to periodically check network card 110 transmit completion status. Network card 110 may expose one or more registers, which may be read/write registers, to driver 108. Using the one or more registers, driver 108 can determine the number of packets that have been enqueued with network card 110 for transmission and the number of packets that have already been sent. From this determination, computing device 102 can determine whether a transmit completion event has occurred, i.e., whether network card 110 has transmitted packets.

Figure 2:
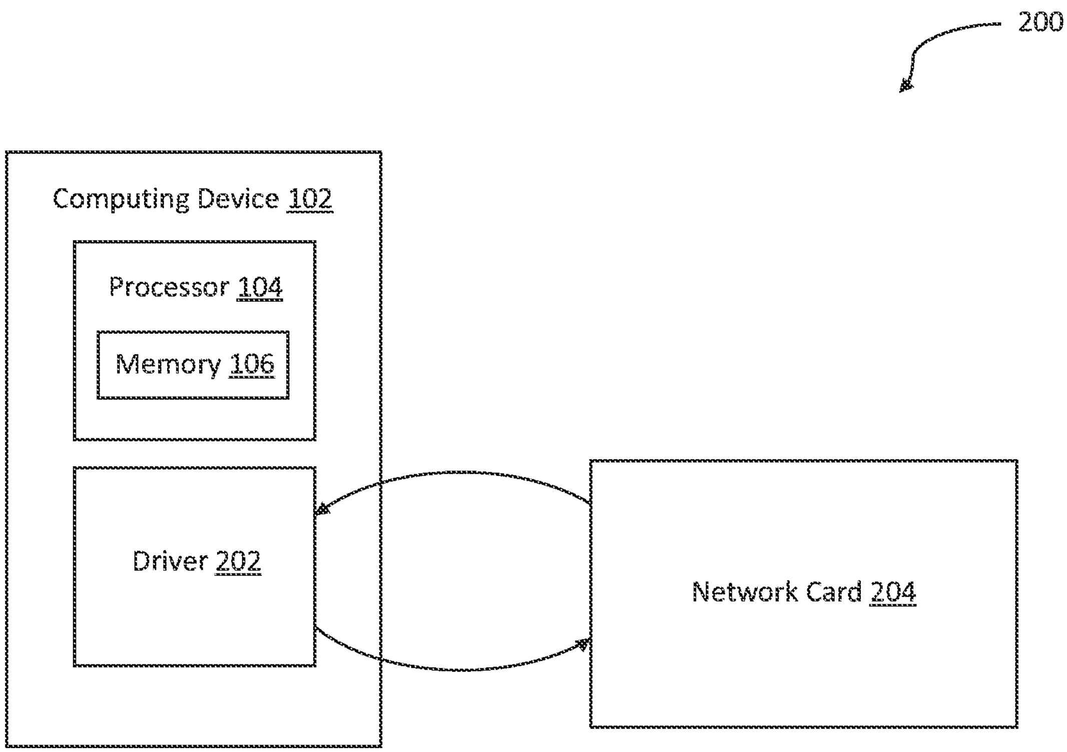
FIG. 2 is a block diagram illustrating an example system for networking that implements polling for a transmit completion status on a network card according to an embodiment of the presently disclosed subject matter.

FIG. 2 is a block diagram illustrating a system 200 for networking that implements polling for a transmit completion status on a network card. Similar to system 100 in FIG. 1, system 200 in FIG. 2 includes computing device 102, which may include processor 104 and memory 106. Computing device 102 may include a driver 202 in user space. Computing device 102, specifically driver 202, may be connected to a network card 204 configured for transmitting packets received from driver 202. Unlike network card 110 in system 100, network card 204 may not be configured to send a transmit completion signal to computing device 102 after transmitting a packet. Computing device 102 may include an application configured for implementing user-space driver 202 for network card 204, for example a Data Plan Development Kit (DPDK) application. Computing device 102 may poll network card 204 to determine a transmit completion event. In some embodiments, computing device 102 may poll network card 204 continuously.

Figure 3:
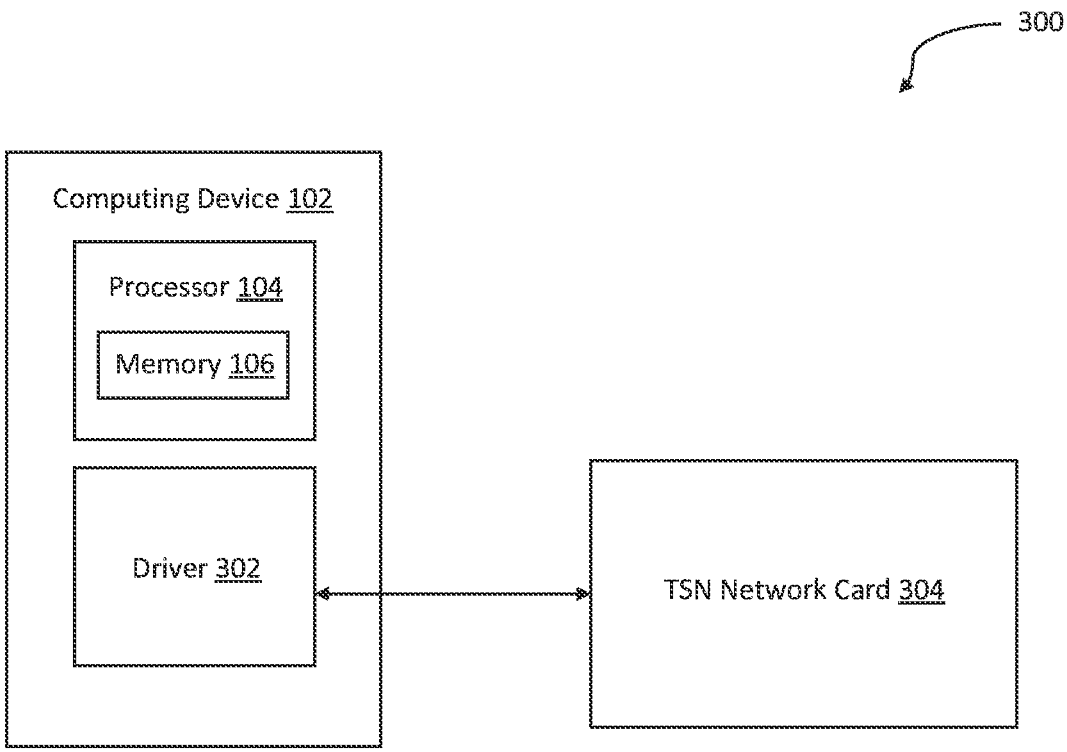
FIG. 3 is a block diagram illustrating an example system for determining an internal time of a TSN network card according to an embodiment of the presently disclosed subject matter.

FIG. 3 is a block diagram illustrating an example system 300 for determining an internal time of a TSN network card. System 300 may include computing device 102 with at least one processor 104 and memory 106. Computing device 102 is configured to generate one or more packets with a launch time parameter. Computing device 102 may generate a group of packets with the same launch time parameter. Each generated packet may include a payload and metadata. The metadata may include the launch time parameter, which indicates the specific time when a TSN network card 304 is to transmit the packet. Computing device 102 may store in memory 106, for example in a CPU memory of computing device 102, the launch time parameter of packets before sending the packets to TSN network card 304. In some embodiments, computing device 102 may include a virtual machine configured for peripheral component interconnect (PCI) passthrough of TSN network card 304 to access the TSN network card 304 directly and bypass a hypervisor. Computing device 102 may queue packets for TSN network card 304 to transmit and store at least a portion of the queued packets in memory 106, for example a CPU memory of computing device 102. In some embodiments, computing device 102 may store only the metadata of queued packets in memory 106. In other embodiments, computing device 102 may store the queued packets in their entirety in memory 106.

Computing device 102, specifically driver 302, sends the packets to TSN network card 304 for transmission. TSN network card 304 is configured to receive one or more packets from computing device 102 and transmit the packets to a connected computer network. TSN network card 304 is a network card that supports a TSN mode configured to transmit one or more packets received from computing device 102 at a specified transmission time, such as a time identified by the launch time parameter. The launch time parameter may include a specific time and/or a time in relation to the current time, such as 50 microseconds from now. TSN network card 304 may include an internal clock to measure a current time for the TSN network card 304. The internal clock may include a physical hardware clock (PHC), for example without limitation a physical hardware clock precision time protocol (PHC-PTP) clock. The internal clock may be incremented by a local oscillator to maintain a time proximate to an external time source. In one example, the internal clock of TSN network card 304 may be synchronized with a precision time protocol (PTP) grandmaster clock. In some embodiments, the internal clock of TSN network card 304 may be synchronized with internal clocks of other network cards.

Computing device 102 receives a transmit completion signal from TSN network card 304 confirming that the TSN network card 304 transmitted the packets. The transmit completion signal may include an interrupt to processor 104. Computing device 102 may acknowledge the interrupt and signal to TSN network card 304 to stop the interrupt. Computing device 102 may determine an approximate current internal time of TSN network card 304 using the launch time parameter of the transmitted packet and the received transmit completion signal indicating that the TSN network card 304 transmitted the packet. Upon receiving the transmit completion signal, the computing device 102 may review the stored packets in memory 106 and identify the packet that was transmitted. Computing device 102 may identify the transmitted packet by maintaining a record in memory 106 of which packets have been sent to TSN network card 304 and which packets have already been transmitted based on previously received transmit completion signals. Computing device 102 may identify the transmitted packet as the packet to follows the last transmitted packet.

In some embodiments, the transmit completion signal may include an identifier of the packet that was transmitted. Computing device 102 may determine which packet was transmitted by matching the identifier in the transmit completion signal with a packet stored in memory 106. Computing device 102 may use the metadata of stored packets in memory 106 to identify the packet that TSN network card 304 transmitted.

After determining which packet was transmitted, computing device 102 may determine the internal time of TSN network card 304 by using the launch time parameter of the packet. For example, if a launch time parameter of a packet that was transmitted directed TSN network card 304 to transmit the packet at 50 microseconds after 9:45:00 am, then computing device 102 may determine that the internal time of the TSN network card 304 when the computing device 102 received the transmit completion signal was approximately the time indicated by the launch time parameter, i.e., 50 microseconds after 9:45:00 am. In some embodiments, computing device 102 may at least determine that the current internal time of TSN network card 304 is the transmission time indicated in the launch time parameter of the transmitted packet or later than the transmission time but not earlier than the transmission time. In instances where computing device 102 queues a group of packets with the same launch time parameter, TSN network card 304 may send a transmit completion signal once the first packet of the group has been transmitted. Computing device 102 may use the transmit completion signal of the first packet to determine the internal time of TSN network card 304 because the transmission of the first packet in the group will be closest in time to the launch time parameter. In some embodiments, computing device 102 may determine the time that lapsed from the moment the computing device 102 received the transmit completion signal to the moment the computing device 102 determined the launch time parameter of the transmitted packet and determine the current internal time of TSN network card 304 based on the lapsed time.

Driver 302 may disable transmit completion signals and implement polling to periodically check TSN network card 304 for transmit completion status. In some circumstances, polling TSN network card 304 to determine whether a packet has been transmitted may be faster than otherwise receiving a transmit completion signal, such as an interrupt, from the TSN network card 304, especially when the packet is expected to be transmitted within a relatively short time, for example 10 microseconds. TSN network card 304 may expose one or more registers, which may be read/write registers, to driver 302. Using the one or more registers, driver 302 can determine the number of packets that have been enqueued with TSN network card 304 for transmission and the number of packets that have already been sent. From this determination, computing device 102 can determine whether a transmit completion event has occurred, i.e., whether TSN network card 304 has transmitted packets. Computing device 102 may detect a transmission time for the at least one packet by polling TSN network card 304 for a transmit completion status that includes a transmission time of the packet. In some embodiments, computing device 102 may poll TSN network card 304 continuously. Computing device 102 may determine an approximate current internal time of TSN network card 304 using the transmission time in the transmit completion status. In some embodiments, driver 302 may automatically disable transmit completion signals and implement polling to determine a transmission time of one or more packets when the launch time parameter of the one or more packets is lower than a threshold, for example 10 microseconds.

Computing device 102 may include an internal clock that the computing device 102 sets based on the determined internal time of TSN network card 304. Computing device 102 may synchronize a system time and/or a CPU time with the determined internal time of TSN network card 304. In some embodiments, TSN network card 304 may have a plurality of internal clocks and computing device 102 may synchronize the internal clocks according to the determined internal time of TSN network card 304 so that all the clocks are synchronized with each other. System 300 may include a plurality of TSN network cards within a network and computing device 102 may be configured to synchronize all the TSN network cards according to the determined internal time of TSN network card 304. Computing device 102 may delete from memory 106 the stored launch time parameter of a packet, metadata of the packet, and/or the entire packet after determining the approximate current internal time of TSN network card 304 based on the completed transmission of the corresponding packet.

Once computing device 102 receives an interrupt for a packet or a group of packets transmitted, computing device 102 may then queue a next group of packets for TSN network card 304 to transmit. Computing device 102 may generate at least one subsequent packet with a launch time parameter, wherein the launch time parameter of the subsequent packet is based on the determined approximate internal time of TSN network card 304. Scheduling subsequent packets and groups of packets for transmission based on the determined approximate internal time of TSN network card 304 can improve packet transmission efficiency by avoiding unnecessary delays that could be caused if the internal clock of computing device 102 ran fast compared to the internal time of TSN network card 304 and the computing device 102 set launch time parameters with a longer delay than necessary. Scheduling subsequent packets based on the determined internal time of TSN network card 304 can also avoid delays and packet loss caused by congestion if the internal clock of computing device 102 ran slow compared to the internal time of TSN network card 304 and the computing device 102 set launch time parameters too early to provide sufficient time for the TSN network card 304 to transmit the packets. Computing device 102 may also determine when to queue subsequent packets for transmission based on the determined internal time of TSN network card 304. In some embodiments, system 300 may include a plurality of computing devices 102 connected to TSN network card 304, wherein each of the computing devices 102 may determine an approximate current internal time of the TSN network card 304 and queue packets with launch time parameters that are based on the determined time.

Figure 4:
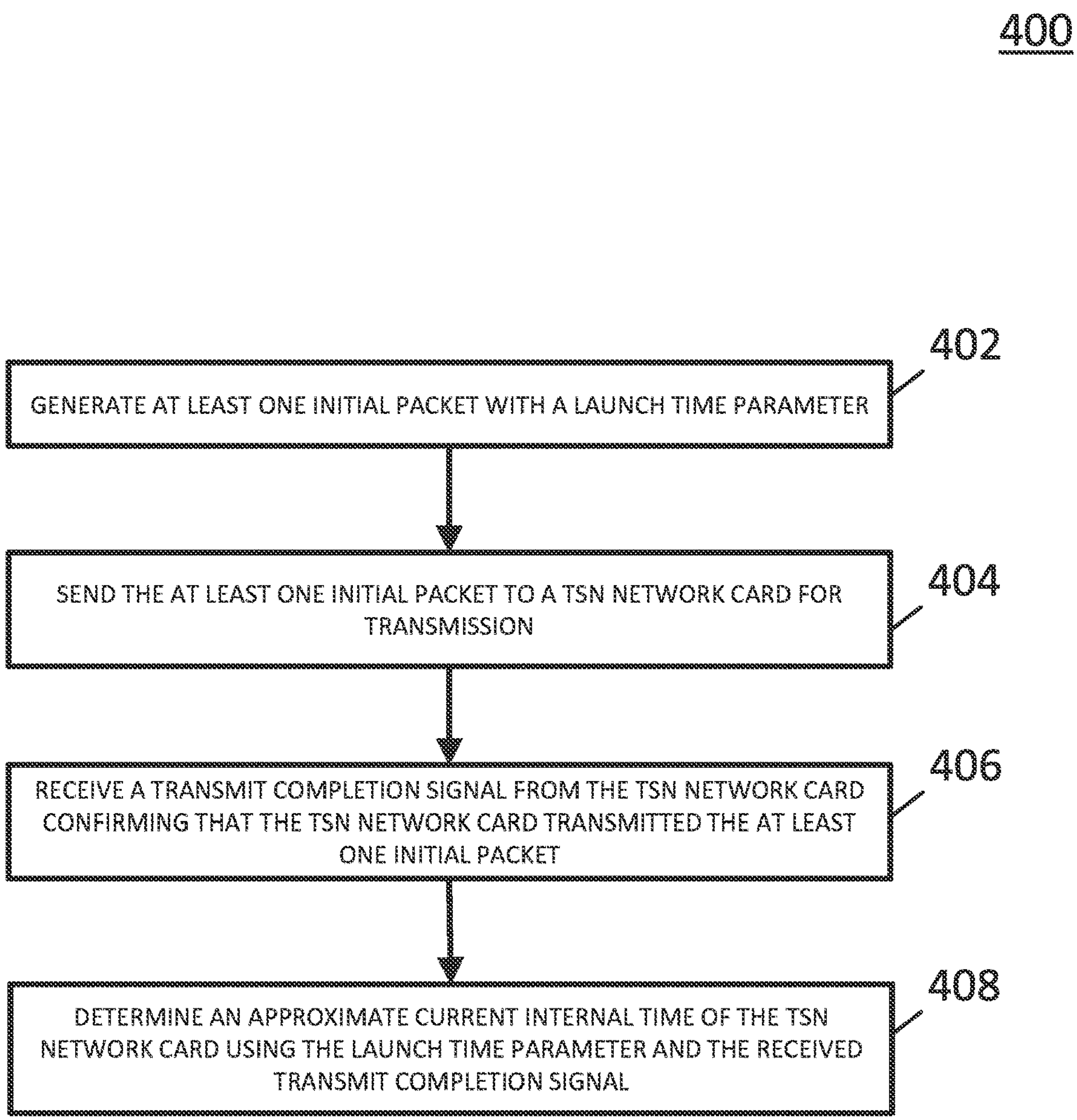
FIG. 4 is a flow diagram illustrating an example method for determining an internal time of a TSN network card according to an embodiment of the presently disclosed subject matter.

FIG. 4 is a flow diagram illustrating an example method 400 for determining an internal time of a TSN network card. At step 402, a computing device generates at least one initial packet with a launch time parameter.

At step 404, the computing device sends the at least one initial packet to a TSN network card for transmission. The computing device may store in a memory the launch time parameter before sending the at least one initial packet to the TSN network card. The computing device may include a virtual machine configured for peripheral component interconnect (PCI) passthrough of the TSN network card.

At step 406, the computing device receives a transmit completion signal from the TSN network card confirming that the TSN network card transmitted the at least one initial packet. The transmit completion signal may include an interrupt.

At step 408, the computing device determines an approximate current internal time of the TSN network card using the launch time parameter and the received transmit completion signal. The computing device may delete the stored launch time parameter of the at least one initial packet after determining the approximate current internal time of the TSN network card. The at least one initial packet may include a plurality of initial packets, wherein determining an approximate current internal time of the TSN network card may include using the received transmit completion signal of a first initial packet of the plurality of initial packets. The internal clock of the TSN network card may be synchronized with a precision time protocol (PTP) grandmaster clock. In some embodiments, the internal clock of the TSN network card may be synchronized with other network card internal clocks.

The computing device may set its internal clock based on the determined approximate current internal time of the TSN network card. The computing device may generate at least one subsequent packet with a launch time parameter, wherein the launch time parameter of the at least one subsequent packet is based on the determined approximate current internal time. The computing device may detect a transmission time for the at least one packet by polling the TSN network card for a transmit completion status that includes a transmission time of the at least one packet. The computing device may determine an approximate current internal time of the TSN network card using the transmission time in the transmit completion status.

It will be appreciated that method 400 is for illustrative purposes and that different and/or additional actions may be used. It will also be appreciated that various actions described herein may occur in a different order or sequence. It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for determining an internal time of a time-sensitive networking (TSN) network card, the method comprising:

generating, at a computing device, at least one initial packet with a launch time parameter;

sending, by the computing device, the at least one initial packet to the TSN network card for transmission;

receiving, by the computing device, a transmit completion signal from the TSN network card confirming that the TSN network card transmitted the at least one initial packet; and determining, by the computing device, an approximate current internal time of the TSN network card using the launch time parameter and the received transmit completion signal.

2. The method of claim 1 comprising storing, in a memory at the computing device, the launch time parameter before sending the at least one initial packet to the TSN network card, and deleting, by the computing device, the stored launch time parameter after determining the approximate current internal time of the TSN network card.

3. The method of claim 1 wherein the at least one initial packet includes a plurality of initial packets, wherein determining an approximate current internal time of the TSN network card includes using the received transmit completion signal of a first initial packet of the plurality of initial packets.

4. The method of claim 1 comprising generating, at the computing device, at least one subsequent packet with a launch time parameter, wherein the launch time parameter of the at least one subsequent packet is based on the determined approximate current internal time.

5. The method of claim 1 wherein the transmit completion signal comprises an interrupt to the computing device.

6. The method of claim 1 comprising synchronizing an internal clock of the TSN network card with a precision time protocol (PTP) grandmaster clock.

7. The method of claim 1 comprising setting a clock in the computing device based on the determined approximate current internal time of the TSN network card.

8. The method of claim 1 wherein the computing device includes a virtual machine configured for peripheral component interconnect (PCI) passthrough of the TSN network card.

9. The method of claim 1 comprising:

detecting, by the computing device, a transmission time for the at least one packet by polling the TSN network card for a transmit completion status, the transmit completion status including a transmission time of the at least one packet; and determining, by the computing device, an approximate current internal time of the TSN network card using the transmission time in the transmit completion status.

10. A system for determining an internal time of a time-sensitive networking (TSN) network card, the system comprising:

a processor;

a memory communicatively connected to the processor; and a computing device implemented using the processor and the memory, wherein the computing device is configured for:

generating at least one initial packet with a launch time parameter;

sending the at least one initial packet to the TSN network card for transmission;

receiving a transmit completion signal from the TSN network card confirming that the TSN network card transmitted the at least one initial packet; and determining an approximate current internal time of the TSN network card using the launch time parameter and the received transmit completion signal.

11. The system of claim 10 wherein the computing device is configured for storing, in a memory at the computing device, the launch time parameter before sending the at least one initial packet to the TSN network card, and deleting the stored launch time parameter after determining the approximate current internal time of the TSN network card.

12. The system of claim 10 wherein the at least one initial packet includes a plurality of initial packets, wherein determining an approximate current internal time of the TSN network card includes using the received transmit completion signal of a first initial packet of the plurality of initial packets.

13. The system of claim 10 wherein the computing device is configured for generating at least one subsequent packet with a launch time parameter, wherein the launch time parameter of the at least one subsequent packet is based on the determined approximate current internal time.

14. The system of claim 10 wherein the transmit completion signal comprises an interrupt to the processor.

15. The system of claim 10 wherein the computing device is configured for synchronizing an internal clock of the TSN network card with a precision time protocol (PTP) grandmaster clock.

16. The system of claim 10 wherein the computing device is configured for setting a clock in the computing device based on the determined approximate current internal time of the TSN network card.

17. The system of claim 10 wherein the computing device includes a virtual machine configured for peripheral component interconnect (PCI) passthrough of the TSN network card.

18. The system of claim 10 wherein the computing device is configured for:

detecting a transmission time for the at least one packet by polling the TSN network card for a transmit completion status, the transmit completion status including a transmission time of the at least one packet; and determining an approximate current internal time of the TSN network card using the transmission time in the transmit completion status.

19. A non-transitory computer readable medium having stored thereon executable instructions that when executed by at least one processor of at least one computer cause the at least one computer to perform steps comprising:

generating at least one initial packet with a launch time parameter;

sending the at least one initial packet to a time-sensitive networking (TSN) network card for transmission;

receiving a transmit completion signal from the TSN network card confirming that the TSN network card transmitted the at least one initial packet; and determining an approximate current internal time of the TSN network card using the launch time parameter and the received transmit completion signal.

20. The medium of claim 19, the steps comprising generating at least one subsequent packet with a launch time parameter, wherein the launch time parameter of the at least one subsequent packet is based on the determined approximate current internal time.

* * * * *